United States Patent
Brunet et al.

(10) Patent No.: US 6,849,979 B2
(45) Date of Patent: Feb. 1, 2005

(54) ACTIVE MAGNETIC BEARING WITH INTEGRATED DETECTORS

(75) Inventors: Maurice Brunet, Saint Colombe Près Vernon (FR); Ulrich Schroeder, Mont Saint-Aignan (FR)

(73) Assignee: Societe de Mecanique Magnetique, Saint Mercel (FR)

( * ) Notice: Subject to any disclaimer, the term of this patent is extended or adjusted under 35 U.S.C. 154(b) by 0 days.

(21) Appl. No.: 10/480,605

(22) PCT Filed: Jun. 13, 2002

(86) PCT No.: PCT/FR02/02022

§ 371 (c)(1),
(2), (4) Date: Dec. 11, 2003

(87) PCT Pub. No.: WO02/103216

PCT Pub. Date: Dec. 27, 2002

(65) Prior Publication Data

US 2004/0164632 A1 Aug. 26, 2004

(30) Foreign Application Priority Data

Jun. 15, 2001 (FR) .............................. 01 07914

(51) Int. Cl.[7] .............................. H02K 7/09; F16C 39/06
(52) U.S. Cl. .................................. 310/90.5; 310/68 B
(58) Field of Search .............................. 310/90.5, 68 B, 310/216

(56) References Cited

U.S. PATENT DOCUMENTS

| 4,088,379 | A | * | 5/1978 | Perper | 310/90.5 |
|---|---|---|---|---|---|
| 4,634,191 | A | * | 1/1987 | Studer | 310/90.5 |
| 4,642,500 | A | * | 2/1987 | Higuchi et al. | 310/90.5 |
| 4,686,404 | A | * | 8/1987 | Nakazeki et al. | 310/90.5 |
| 5,053,662 | A | * | 10/1991 | Richter | 310/90.5 |
| 5,142,175 | A | * | 8/1992 | Watanabe | 310/90.5 |
| 5,209,631 | A | | 5/1993 | Bernhardt | |
| 5,319,273 | A | * | 6/1994 | Hockney et al. | 310/90.5 |
| 5,572,079 | A | | 11/1996 | Pinkerton | |

FOREIGN PATENT DOCUMENTS

| FR | 2 632 451 | | 12/1989 |
|---|---|---|---|
| FR | 2 768 470 | A | 3/1999 |

* cited by examiner

*Primary Examiner*—Tran Nguyen
(74) *Attorney, Agent, or Firm*—Weingarten, Schurgin, Gagnebin & Lebovici LLP

(57) ABSTRACT

The active magnetic bearing (1) comprises a stator (2) fitted with electromagnet windings (21) and a first stack of ferromagnetic laminations (22), a rotor (3) fitted with a second stack of ferromagnetic laminations (9), servo-control circuits (10), and position detectors (4, 5, 6). The first stack of ferromagnetic laminations (22) comprises in succession in the axial direction: at least a first sub-set (2a) of laminations (22a) presenting first notches housing electromagnet windings (21); a second sub-set (2b) of laminations (22b) presenting both first notches housing electromagnet windings (21) and second notches housing a radial detector (6); and a third sub-set (2a) of laminations (22a) presenting first notches housing electromagnet windings (21). The first stack of ferromagnetic laminations (22) further comprises fourth and fifth sub-sets (2c) of laminations (22c) at its ends, presenting the same notches as each other and housing respective first and second axial detectors (4, 5).

17 Claims, 6 Drawing Sheets

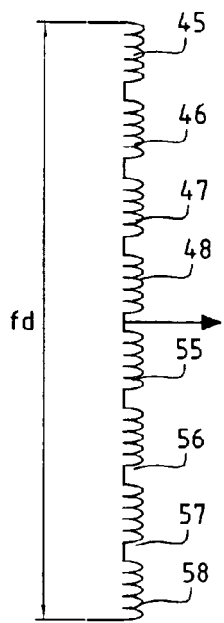
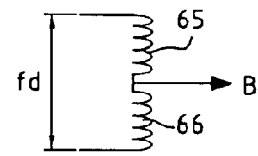
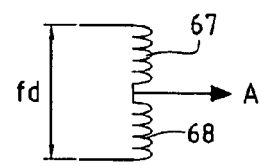
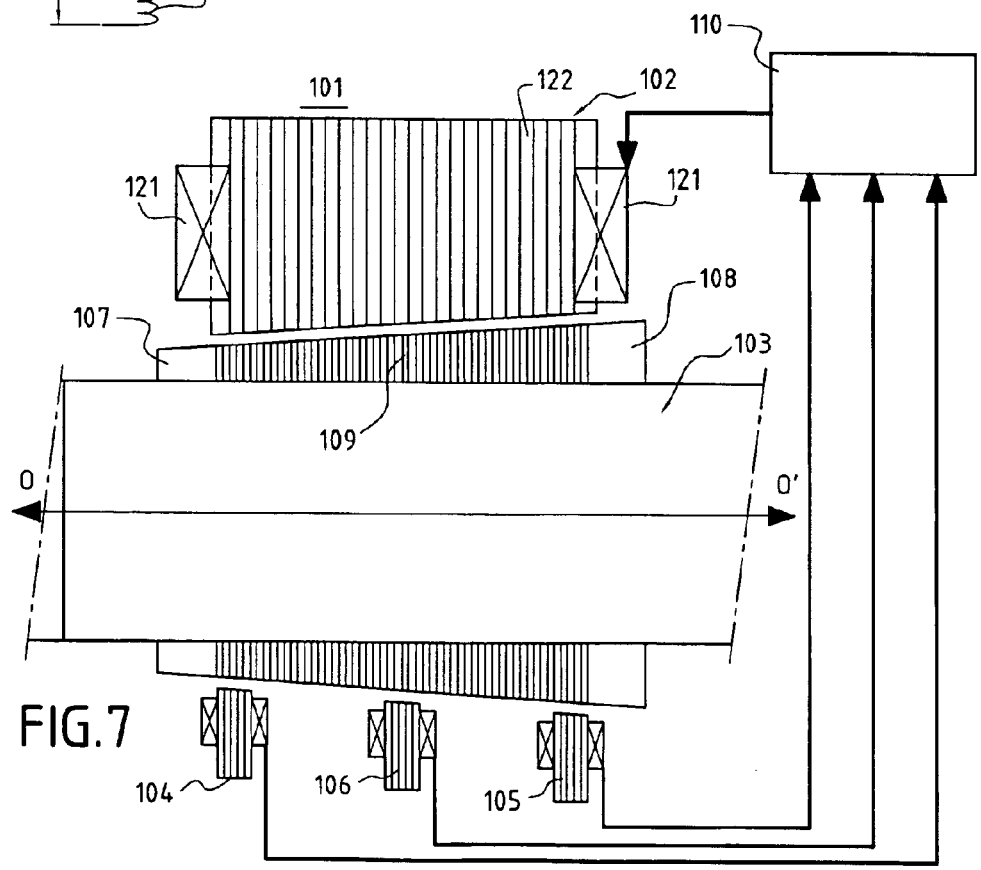

ACTIVE MAGNETIC BEARING WITH INTEGRATED DETECTORS

This application is a 371 national phase filing of PCT/FR02/02022 filed Jun. 13, 2002, and claims priority to a French application No. 01 07914 filed Jun. 15, 2001.

BACKGROUND OF THE INVENTION

The present invention relates to an active magnetic bearing with radial magnetic flux for a rotary machine presenting an axis of rotation OO', the magnetic bearing comprising a stator fitted with electromagnet windings and with a first stack of ferromagnetic laminations extending essentially perpendicularly to the axis OO', a rotor fitted with a second stack of ferromagnetic laminations extending essentially perpendicularly to the axis of rotation OO', servo-control circuits for maintaining the rotor in equilibrium without contact with the stator, and at least one detector for detecting the radial position of the rotor and at least one detector for detecting the axial position of the rotor, which radial and axial position detectors deliver signals to said servo-control circuits, and the currents carried by the electromagnets of the stator are servo-controlled on the basis of said signals.

Most applications which use magnetic bearings conform to the concept shown in FIG. 8. That concept corresponds to clear separation between the various components, and in particular between a radial magnetic bearing 200, a radial position detector 201, and an axial position detector 301.

In some cases, as described for example in document FR 2 632 451, the device has first and second radial detectors disposed respectively in the vicinity of a radial magnetic bearing and of a conical magnetic bearing, and extending around the rotor over an angular sector of 180°. Such a device further comprises an axial detector extending around the rotor over an angular sector of not more than 180° and disposed in the vicinity of the conical magnetic bearing substantially in the same radial plane as the second radial detector. Thus, the axial and radial detectors are combined, and use the same ring of rotor laminations. Nevertheless, those detectors are not integrated in a bearing.

In other cases, such as described for example in patent FR 2 094 326, the radial detectors are interposed between radial bearings, but axial detection remains independent.

In each of those cases, the juxtaposition of bearing stacks, radial detectors, and axial detectors leads to a system in which the length of the bearing function as a whole is large and in which the dynamic behavior of the rotor leads to problems.

In addition, as can be seen in FIG. 9, having a difference in position, i.e. non-coincidence between the radial detection point 202 and the reaction point 203 of the radial bearing makes servo-control considerably more complicated to define. Deformation due to the mechanical design of the rotor can cause nodes 204 to be situated between the radial bearing 200 and the radial detector 202, in such a manner that phase reversals occur between detection and reaction, which leads to erroneous reactions by the magnetic bearing.

SUMMARY OF THE INVENTION

The present invention seeks to remedy the above-mentioned drawback, and in particular to enable the length of rotary machines to be shortened by implementing magnetic bearing assemblies that are more compact.

Another object of the present invention is to avoid non-coincidence between detection points and reaction points in an active magnetic suspension for a rotor.

These objects are achieved by a magnetic bearing of the type defined in the introduction to the description, characterized in that, in accordance with the invention, the first stack of ferromagnetic laminations of the stator comprises in succession in the axial direction: at least a first sub-set of laminations presenting first notches housing electromagnet windings of the stator; a second sub-set of laminations presenting both first notches housing electromagnet windings of the stator and second notches housing a radial detector; and a third sub-set of laminations presenting first notches housing electromagnet windings of the stator; and in that the first stack of ferromagnetic laminations of the stator further comprises, at its ends, fourth and fifth sub-sets of laminations presenting the same notches as each other and housing respective first and second axial detectors.

Advantageously, the detection point at which the position of the rotor is detected by the position detectors coincides with the point of reaction of the active magnetic bearing.

According to a characteristic of the present invention, the second stack of laminations of the rotor extends over an axial length that is slightly longer than the length of the first stack of laminations of the stator.

According to another characteristic, the rotor includes respective solid non-magnetic rings situated at each end of the second stack of laminations of the rotor.

The non-magnetic rings may be made of steel, bronze, or aluminum.

In an embodiment of the invention, each axial or radial position detector comprises a plurality of detector elements.

In a particular embodiment, each axial or radial position detector comprises four detector elements.

The detector elements may be windings of the inductive type.

According to a characteristic of the present invention, that departures from parallelism of the planes between the laminations of the second stack of laminations and the non-magnetic rings are averaged by connecting the detector elements of each axial detector in series.

Advantageously, axial position detection is defined at the same location as radial detection.

According to an aspect of the invention, the detector elements of one axial detector are connected in a bridge circuit with the detector elements of the other axial detector.

According to another aspect, the frequency $f_d$ of the oscillator exciting the detectors is decoupled from the frequency $f_p$ of the current fed to the electromagnets of the magnetic bearing.

Preferably, the decoupling is performed by synchronizing the detector excitation frequency $f_d$ and the feed frequency $f_p$ of the electromagnets of the magnetic bearing in a ratio of 1 to 2, such that $f_d=f_p/2$.

By way of example, the decoupling is performed by feeding the magnetic bearings through filters.

According to another characteristic of the present invention, the thickness of the laminations of the second stack of laminations lies in the range 0.1 millimeters (mm) to 0.2 mm.

In a first particular embodiment, the active magnetic bearing is of the radial type.

In another embodiment, the active magnetic bearing is of the conical type having radial and axial action.

Other characteristics and advantages of the invention appear from the following description of particular embodiments, given as examples and with reference to the accompanying drawings,

BRIEF DESCRIPTION OF THE DRAWINGS

FIG. 5 is a diagram of the bridge circuit for the radial detector windings of FIG. 2B;

FIG. 6 is a diagram of the bridge circuit for the axial detector windings of FIG. 2C;

FIG. 7 is a view analogous to the view of FIG. 2, but in which the active magnetic bearing is of the conical type having radial and axial action;

DETAILED DESCRIPTION OF THE INVENTION

Figure 1:
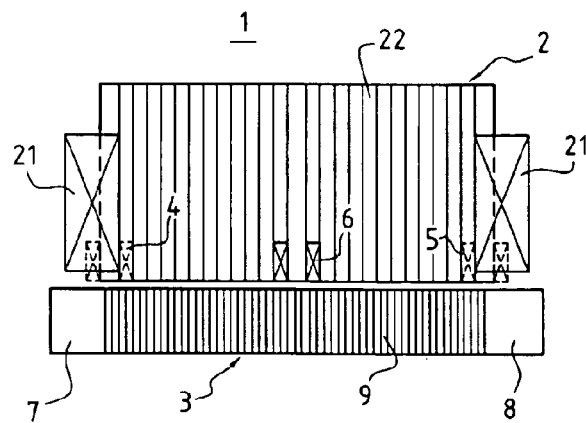
FIG. 1 is an axial half-section view of an embodiment of an active magnetic bearing in accordance with the invention.

FIG. 1 shows an example of a compact active magnetic bearing 1 of the invention with radial magnetic flux for fitting to a rotary machine. The magnetic bearing 1 comprises a stator 2 and a rotor 3 which are in rotary motion relative to each other, it being possible for the rotor 3 to be either inside or outside the stator 2. The stator 2 is fitted with electromagnet windings 21, a stack of ferromagnetic laminations 22, a detector 6 for detecting the radial position of the rotor 3, and two detectors 4 and 5 for detecting the axial position of the rotor 3. The rotor 3 is fitted with a stack of ferromagnetic laminations 9 which extend over an axial length that is slightly greater than the axial length of the stack of stator laminations 22, and with two solid non-magnetic rings 7 and 8 situated at respective opposite ends of the stack of rotor laminations 9. By way of example, the non-magnetic rings 7 and 8 may be made out of steel, bronze, or aluminum.

The rotor 3 fitted with ferromagnetic laminations 9 is held by the magnetic fields created by the electromagnets disposed on the stator 2. The rotor 3 is thus in equilibrium without making mechanical contact with the stator 2. Its position is identified by means of the detectors 4, 5, and 6 which are preferably of the inductive type, but which could equally well be of any other type, serving continuously to sense any displacements and to deliver signals via an electronic servo-control loop for driving the currents in the electromagnet windings 21 in such a manner that the magnetic attraction forces return the rotor to its nominal position in the event of departure therefrom.

Figure 2:
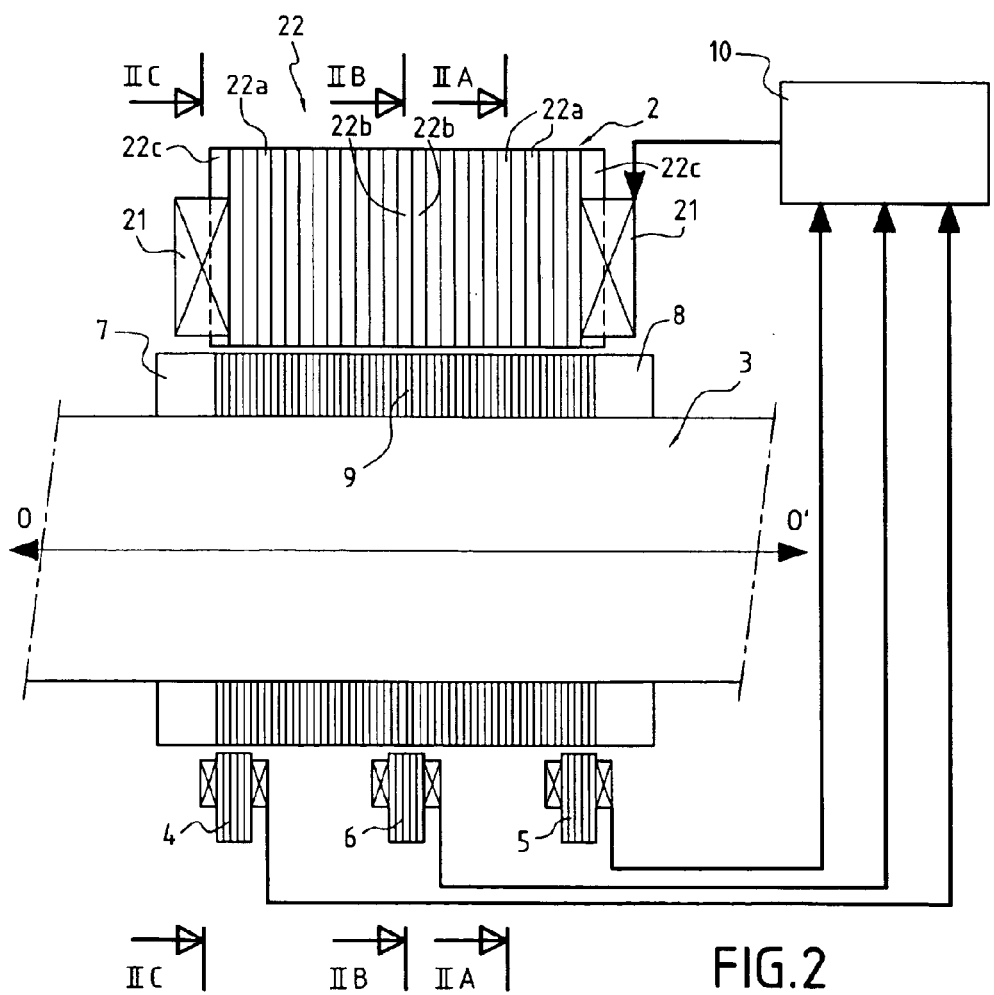
FIG. 2 is a view of an active magnetic bearing showing bearing windings in the top axial half-section, and a radial detector and two axial detectors delivering signals to a servo-control circuit in the bottom half-section.

In the embodiment shown in FIG. 2, the magnetic bearing comprises a stator yoke 2 fitted with windings 21. The stator portion 2 of the magnetic bearing co-operates with an armature 9 of ferromagnetic material of the rotor 3 mounted facing the yoke of the stator 2 on axis OO'. For the rotor, a single stack of laminations is used, the laminations having thickness lying in the range 0.1 mm to 0.2 mm, e.g. being made of iron or of silicon. For the radial magnetic bearing function, the stack of rotor laminations is slightly longer than the stack of stator laminations so as to avoid the radial bearing heating in the rotor. The magnetic bearing also has a conventional axial magnetic abutment which is not shown in FIG. 2 but which is controlled on the basis of the pair of axial detectors 4, 5 integrated in the radial bearing.

Figure 2A:
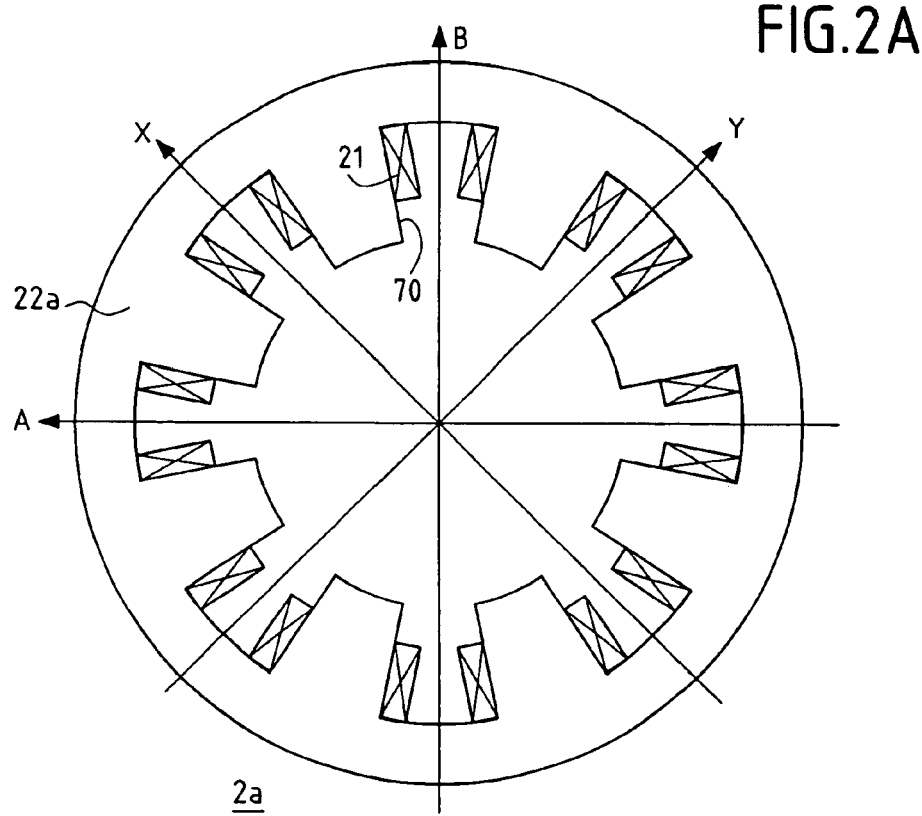
FIG. 2A is a view on line IIA—IIA of FIG. 2 showing how stator laminations are cut out to present first notches for the radial bearing function.
Figure 2B:
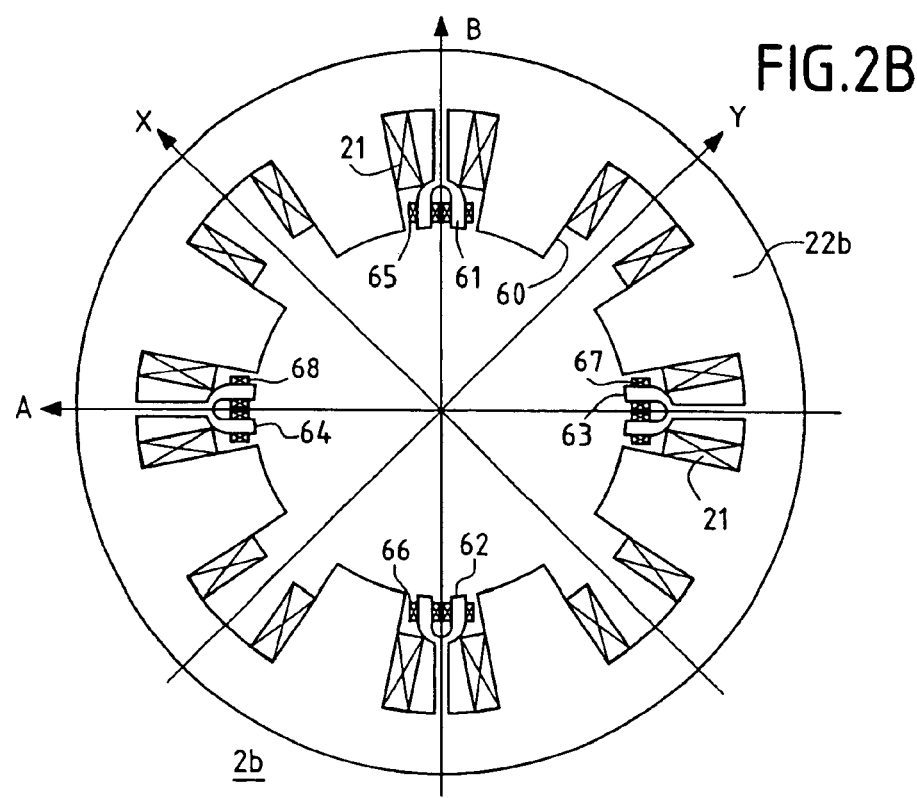
FIG. 2B is a view on line IIB—IIB of FIG. 2, showing how stator laminations are cut out to present both first notches for the radial bearing function and second notches for the radial detector function.

The yoke of the stator portion 2 is fitted with a stack of ferromagnetic laminations 22. The stack of ferromagnetic laminations of the stator comprises in succession in the axial direction five sets of laminations. A first set of laminations 2a houses electromagnet windings 21 of the stator for the radial bearing function alone (FIG. 2A). A second set of laminations 2b houses electromagnet windings 21 for the radial bearing function, and also a radial detector 6 (FIG. 2B). A third set of laminations 2a is identical to the first set of laminations 2a and houses electromagnet windings 21 of the stator for the radial bearing function alone (FIG. 2A). The ends of the stack of ferromagnetic laminations 22 of the stator 2 comprise fourth and fifth sets 2c of laminations housing respectively the first and second axial detectors 4 and 5 (FIG. 2C) situated at opposite ends of the central group of laminations comprising the first, second, and third sets of laminations.

In the embodiment of FIG. 2, the axial detectors 4, 5 and the radial detector 6 are of the inductive type, delivering signals for servo-controlling the currents carried by the windings of the radial magnetic bearing and of the axial magnetic abutment (not shown) by means of a conventional servo-control circuit 10. The purpose of the servo-control circuit 10 is to control the position of the rotor 3 by acting on the currents carried by the electromagnets on the basis of the signals delivered by the position detectors.

The non-magnetic rings 7 and 8 situated at each end of the stack of laminations 9 of the rotor 3 serve as reference rings enabling the axial detectors 4 and 5 to determine accurately the axial position of the rotor 3 relative to the stator assembly 2. The axial detectors 4 and 5 co-operate in part with the non-magnetic rings 7 and 8. Thus, during axial displacement of the rotor 3, the partial overlaps of each of the non-magnetic rings 7 and 8 with the armature 9 of the rotor 3 are different so that the signals delivered by the axial detectors 4 and 5 are different, thereby supplying information about the axial position of the rotor with double accuracy, enabling the axial abutment to be servo-controlled properly for maintaining a predetermined axial position. In a nominal axial position, the non-magnetic rings 7 and 8 overlap half of the stack of fixed laminations constituting the axial detectors 4 and 5 respectively.

The radial detector 6 detects any variation in the airgap, i.e. in the empty space between the rotor 3 and the stator 2. The signal from the detector 6 is then compared by the servo-control circuit 10 with a reference signal defining the nominal position of the rotor 3, thus enabling the radial bearing to be servo-controlled properly for maintaining the center of the stator 2 in a radial position on the axis OO'.

Figure 2C:
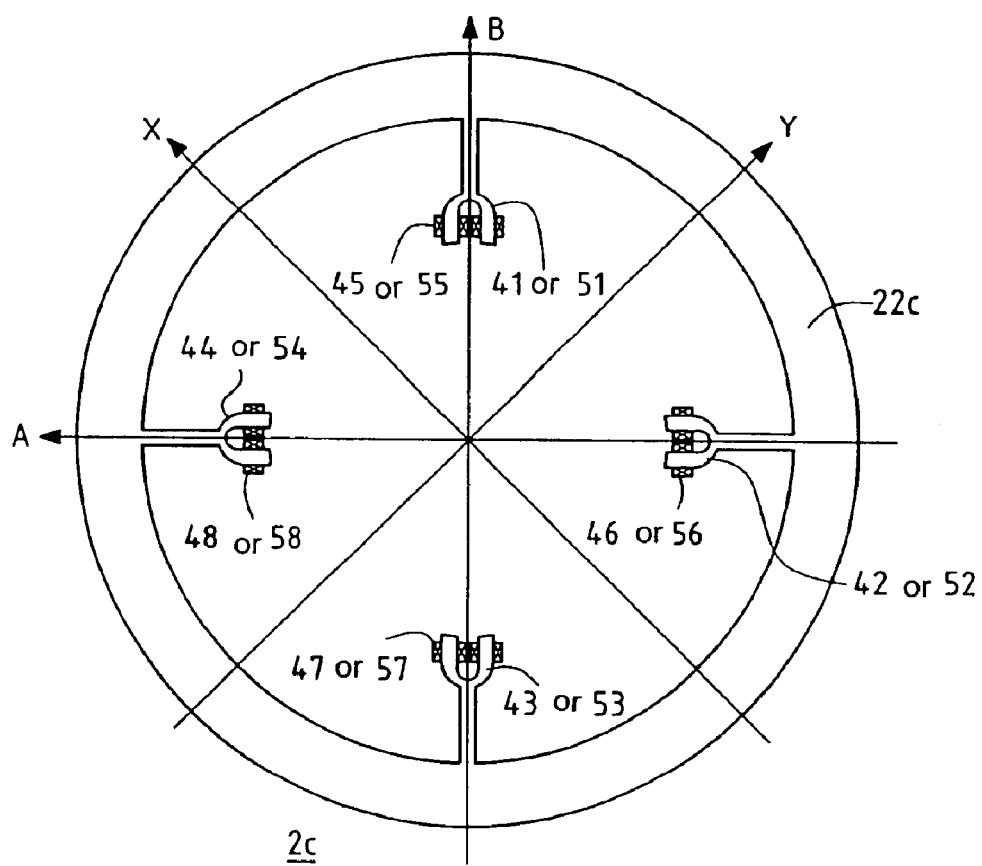
FIG. 2C is a view on line IIC—IIC of FIG. 2 showing how stator laminations are cut out to present notches for the axial detector function.

FIGS. 2A, 2B, and 2C show the different ways in which the laminations of the stator 2 are cut out.

FIG. 2A shows a lamination 22a that could belong to the first set or third set 2a of laminations. The lamination 22a presents a plurality of notches 70 housing electromagnet windings 21 for the radial bearing function alone.

FIG. 2B shows a lamination 22b belonging to the second set 2b of laminations. The lamination 22b presents a plurality of notches 60 housing the electromagnet windings 21 for the radial bearing function along axes X and Y. Some of the notches extending along axes A and B interposed between the axes X and Y include additional teeth 61, 62, 63, and 64 with detector windings 65, 66, 67, and 68 wound thereabout to perform the radial detector function. The fact of interposing the radial detector between the axes X and Y of the radial bearing leads to a small reduction in the working area of the active bearing, and thus to a loss of loading which must be compensated by enlarging the bearing to some extent. Nevertheless, the loss of loading remains very small since the loss area corresponds to a large angle relative to the axis of the bearing, and the reduction in the projection of the loading onto the axis is limited. Precise calculations performed for a real bearing having a diameter of 150 mm show that the loss of loading due to integrating a radial detector causes only about 10% of the linear loading to be lost, while the saving in overall size is much more substantial.

FIG. 2C shows a lamination 22c belonging to the fourth set or the fifth set 2c of laminations, presenting a plurality of teeth 41, 42, 43, 44 or 51, 52, 53, 54 of the same shape, oriented along axes A and B interposed between the axes X and Y of the laminations representing the axes along which the radial bearing acts. The set of laminations presenting the teeth 41, 42, 43, and 44 and housing respective electromagnet windings 45, 46, 47, and 48 represent the first axial detector 4, while the set of laminations presenting the teeth 51, 52, 53, and 54 and housing respective electromagnet windings 55, 56, 57, and 58 represent the second axial detector 5. The concerted inductive detection performed by the two detectors 4 and 5 provides an indication of the axial position of the rotor 3.

Comparing the axial size of a magnetic bearing of the invention with the axial size of a prior art magnetic bearing, it can be seen that the reduction in length may be 34 mm over 157 mm, giving a saving of about 22% for equivalent loading.

Figure 3:
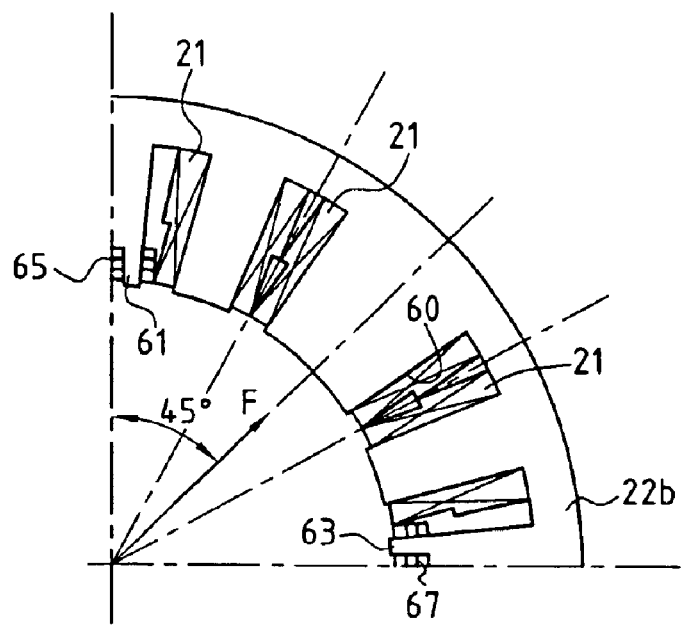
FIG. 3 is a view showing a variant of FIG. 2B.
Figure 4:
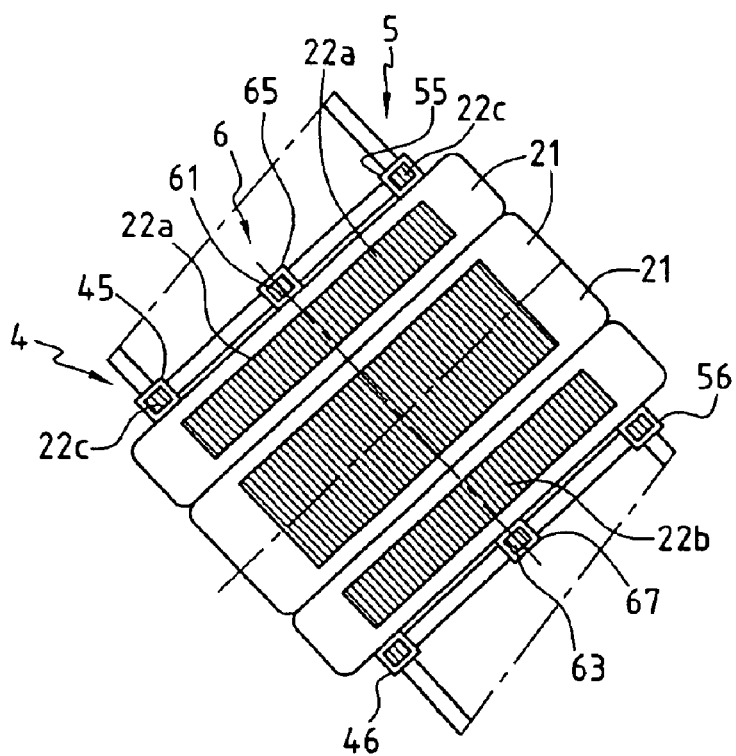
FIG. 4 is a view looking along arrow F of FIG. 3.
Figure 8:
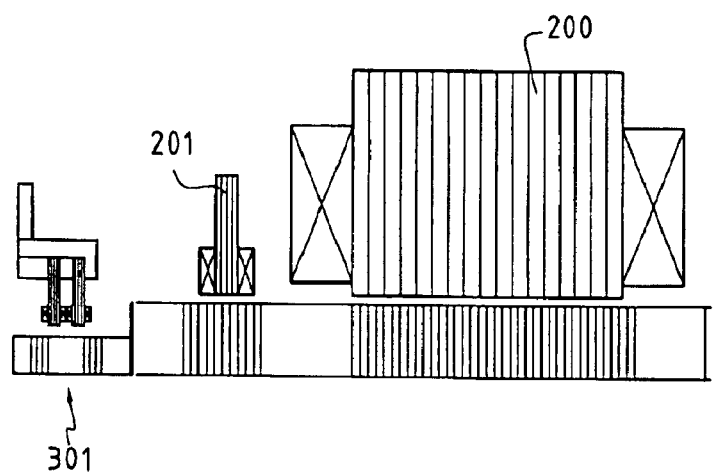
FIG. 8 is an axial half-section view of an example of a prior art active magnetic bearing.
Figure 9:
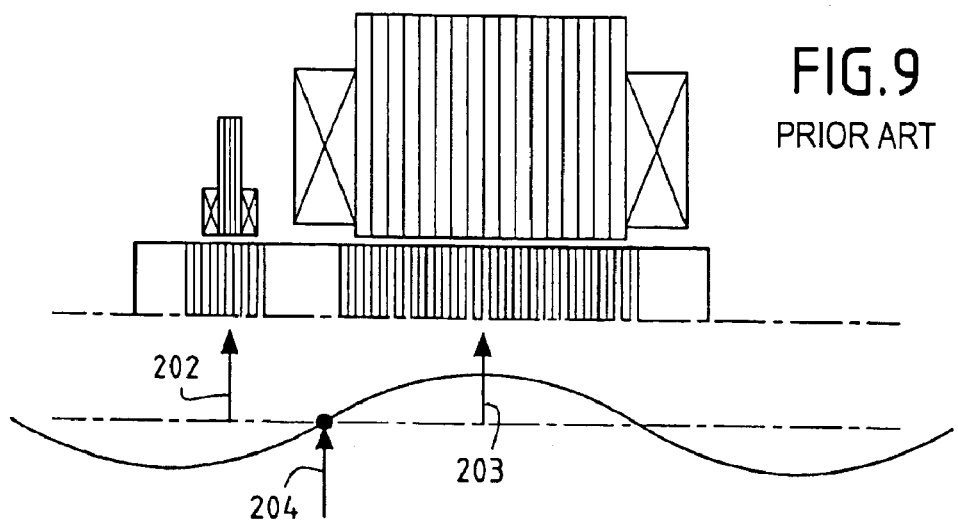
FIG. 9 shows the phenomenon of non-coincidence between the radial detection point and the reaction point of the prior art radial bearing.

FIGS. 3 and 4 show a particular embodiment of a radial bearing of the invention having both a radial detector 6 and axial detectors 4, 5.

FIG. 5 shows the windings 65, 66, 67, and 68 of the radial detector 6 which are in a bridge circuit. The windings 65 and 66 provide detection along the axis B with even harmonics being eliminated. The windings 67 and 68 provide detection along the axis A with even harmonics being eliminated. Detection along the axes X and Y of the radial bearing is obtained by combination using the electronic circuits in the servo-control circuit 10. Detection along the radial axis X is obtained by adding the detection signal along the axis A and the detection signal along the axis B so as to obtain a signal X=A+B. Detection along the radial axis Y is obtained by subtracting the detection signal along the axis A from the detection signal along the axis B, so as to obtain a signal Y=B−A.

The windings 45, 46, 47, and 48 of the first axial detector 4 are connected in series, thus forming a first set for averaging out departures from parallelism in the flank of the non-magnetic ring against the laminations of the armature of the rotor 3. A second set is formed by connecting in series the windings 55, 56, 57, and 58 of the second axial detector 5 which is situated at the other end of the bearing. The first set is then connected in a bridge circuit in association with the second set. This bridge circuit doubles detection sensitivity and also defines a virtual axial detection point situated in the middles of the two axial detection rings, i.e. in the middle of the radial bearing at the same location as the radial detection. Consequently, the position of the rotor 3 as detected by the axial and radial position detectors 4, 5, and 6 coincides with the same point as the point which coincides with the reaction of the active magnetic bearing 1. This coincidence between detection points and reaction points makes the control system easier to implement and increases the precision of servo-control.

The fact of integrating the axial detectors and the radial detector within the radial bearing could run the risk of increasing magnetic and electrical coupling between the detectors and the bearing. To avoid such coupling, the frequency $f_d$ of the oscillator exciting the detectors 4, 5, and 6 is decoupled from the frequency $f_p$ of the current feeding the electromagnets of the magnetic bearing.

This decoupling can be achieved by synchronizing the detector frequency $f_d$ and the electromagnet frequency $f_p$ of the magnetic bearing with a ratio of 1 to 2, i.e. $f_d=f_p/2$.

This synchronization completely decouples the two functions. Optionally, the decoupling may be implemented by feeding the magnetic bearings via inductive-capacitive (LC) filters placed at the outputs of the amplifiers in order to prevent the chopper high frequency of the amplifiers appearing in the metal mass of the bearing, and thus avoid the above-mentioned coupling.

FIG. 7 is an axial section view of an active magnetic bearing 101 constituting a second embodiment of the invention. In this embodiment, the active magnetic bearing 101 is a conical bearing providing both radial and axial action, and in which all of the axial bearing, radial bearing, axial detector, and radial detector functions are integrated in the same unit.

The magnetic bearing 101 comprises a stator yoke 102 of conical shape provided with magnetic windings 121. The stator portion 102 of the magnetic bearing co-operates with a conically-shaped armature of ferromagnetic material 109 of the rotor 103 lying on the axis OO' and facing the stator yoke 102. The conical shape of the magnetic bearing generates an axial component in the magnetic field in addition to its radial component, and as a result an additional axial magnetic abutment is no longer needed.

The yoke of the stator portion 2 is fitted with a conical stack of ferromagnetic laminations 122. The stack of ferromagnetic laminations 122 of the stator comprises in succession in the axial direction, five sets of laminations. A first set of laminations houses electromagnet windings 121 for the radial bearing function alone. A second set of laminations houses electromagnet windings 121 for the radial bearing function and also a radial detector 106. A third set of laminations houses electromagnet windings 121 for the radial bearing function alone. The ends of the stack of ferromagnetic laminations 122 of the stator 102 comprise fourth and fifth sets of laminations housing respective first and second axial detectors 104 and 105. The axial detectors 104 and 105, and the radial detector 106 deliver signals on the basis of which the currents carried by the windings of the radial and axial magnetic bearing are servo-controlled by means of the servo-control circuit 110.

The non-magnetic rings 107 and 108 are conical in shape and situated at opposite ends of the stack of rotor laminations 109. These rings 107 and 108 serve as reference rings enabling the axial detectors 104 and 105 to determine accurately the axial position of the rotor 103 relative to the stator assembly 102.

Apart from the frustoconical shape of the airgap-defining walls of the stator 102 and of the rotor 103, and apart from the fact that the bearing can respond directly to the signals transmitted by the radial detector 106 and by the axial detectors 104 and 105 to the servo-control circuit 110, the configuration of the stator 102 is analogous to that of the stator 2 of the bearing in FIG. 2, and the components given with reference to FIGS. 2A, 2B, 2C, and 3 to 6 apply equally to the embodiment of FIG. 7.

What is claimed is:

1. An active magnetic bearing with radial magnetic flux for a rotary machine presenting an axis of rotation OO', the magnetic bearing comprising a stator fitted with electromagnet windings and with a first stack of ferromagnetic laminations extending essentially perpendicularly to the axis OO', a rotor fitted with a second stack of ferromagnetic laminations extending essentially perpendicularly to the axis of rotation OO', servo-control circuits for maintaining the rotor in equilibrium without contact with the stator, and at least one detector for detecting the radial position of the rotor and at least one detector for detecting the axial position of the rotor, which radial and axial position detectors deliver signals to said servo-control circuits, and the currents carried by the electromagnets of the stator are servo-controlled on the basis of said currents; wherein the first stack of ferromagnetic laminations of the stator comprises in succession in the axial direction: at least a first sub-set of laminations presenting first notches housing electromagnet windings of the stator; a second sub-set of laminations presenting both first notches housing electromagnet windings of the stator and second notches housing a radial detector; and a third sub-set of laminations presenting first notches housing electromagnet windings of the stator; and in that the first stack of ferromagnetic laminations of the stator further comprises, at its ends, fourth and fifth sub-sets of laminations presenting the same notches as each other and housing respective first and second axial detectors.

2. A magnetic bearing according to claim 1, wherein the detection point at which the position of the rotor is detected by the position detectors coincides with the point of reaction of the active magnetic bearing.

3. A magnetic bearing according to claim 1, wherein the second stack of laminations of the rotor extends over an axial length that is slightly longer than the length of the first stack of laminations of the stator.

4. A magnetic bearing according to claim 1, wherein the rotor includes respective solid non-magnetic rings situated at each end of the second stack of laminations of the rotor.

5. A magnetic bearing according to claim 4, wherein the non-magnetic rings are made of steel, bronze, or aluminum.

6. A magnetic bearing according to claim 1, wherein each axial or radial position detector comprises a plurality of detector elements.

7. A magnetic bearing according to claim 1, wherein each axial or radial position detector comprises four detector elements.

8. A magnetic bearing according to claim 6, wherein the detector elements are inductive type windings.

9. A magnetic bearing according to claim 1, wherein the rotor includes respective solid non-magnetic rings situated at each end of the second stack of laminations of the rotor, and further wherein departures from parallelism of the planes between the laminations of the second stack of laminations and the non-magnetic rings are averaged by connecting the detector elements of each axial detector series.

10. A magnetic bearing according to claim 1, wherein axial position detection is defined at the same location as radial detection.

11. A magnetic bearing according to claim 10, wherein the detector elements of one axial detector are connected in a bridge circuit with the detector elements of the other axial detector.

12. A magnetic bearing according to claim 1, wherein the frequency $f_d$ of the oscillator exciting the detectors is decoupled from the frequency $f_p$ of the current fed to the electromagnets of the magnetic bearing.

13. A magnetic bearing according to claim 12, wherein the decoupling is performed by synchronizing the detector excitation frequency $f_d$ and the feed frequency $f_p$ of the electromagnets of the magnetic bearing in a ratio of 1 to 2, such that $f_d = f_p/2$.

14. A magnetic bearing according to claim 12, wherein the decoupling is performed by feeding the magnetic bearings through filters.

15. A magnetic bearing according to claim 1, wherein the thickness of the laminations of the second stack of laminations lies in the range 0.1 mm to 0.2 mm.

16. A magnetic bearing according to claim 1, wherein the active magnetic bearing is of the radial type.

17. A magnetic bearing according to claim 1, wherein the active magnetic bearing is of the conical type having radial and axial action.

* * * * *

UNITED STATES PATENT AND TRADEMARK OFFICE
CERTIFICATE OF CORRECTION

PATENT NO. : 6,849,979 B2
DATED : February 1, 2005
INVENTOR(S) : Maurice Brunet et al.

It is certified that error appears in the above-identified patent and that said Letters Patent is hereby corrected as shown below:

Title page,
Item [73], Asssignee, "Saint Mercel" should read -- Saint Marcel --;

Column 8,
Line 11, "claim 1" should read -- claim 6 --; and
Line 17, "detector series." should read -- detector in series. --.

Signed and Sealed this

Twelfth Day of July, 2005

JON W. DUDAS
*Director of the United States Patent and Trademark Office*